(12) United States Patent
Matsuda et al.

(10) Patent No.: US 8,147,365 B2
(45) Date of Patent: Apr. 3, 2012

(54) DRIVE BELT

(75) Inventors: Hisashi Matsuda, Hyogo (JP); Yuji Sekiguchi, Hyogo (JP)

(73) Assignee: Bando Chemical Industries, Ltd. (JP)

( * ) Notice: Subject to any disclaimer, the term of this patent is extended or adjusted under 35 U.S.C. 154(b) by 729 days.

(21) Appl. No.: 11/600,319

(22) Filed: Nov. 16, 2006

(65) Prior Publication Data

US 2007/0111834 A1 May 17, 2007

(30) Foreign Application Priority Data

Nov. 17, 2005 (JP) .................. 2005-333290

(51) Int. Cl.
F16G 1/00 (2006.01)
F16G 5/00 (2006.01)
F16G 9/00 (2006.01)
(52) U.S. Cl. ........................ 474/260; 474/263
(58) Field of Classification Search .................. 474/260, 474/263
See application file for complete search history.

(56) References Cited

U.S. PATENT DOCUMENTS

| | | | | |
|---|---|---|---|---|
| 1,729,329 A * | 9/1929 | Chilton | ......................... | 156/140 |
| 5,609,243 A | 3/1997 | Fujita et al. | | |
| 5,611,745 A | 3/1997 | Uto et al. | | |
| 6,303,727 B1 * | 10/2001 | Maeda et al. | ................. | 526/335 |
| 6,492,454 B1 * | 12/2002 | Ozawa et al. | ................. | 524/493 |
| 6,569,936 B1 * | 5/2003 | Kawasaki et al. | ............. | 524/495 |
| 2002/0032091 A1 * | 3/2002 | Okuno et al. | ................. | 474/260 |

FOREIGN PATENT DOCUMENTS

| | | |
|---|---|---|
| JP | 07-077244 | 3/1995 |
| JP | 08-035540 A | 2/1996 |
| JP | 08-233037 A | 9/1996 |
| JP | 09-087434 A | 3/1997 |
| JP | 09-144816 | 6/1997 |
| JP | 09-159000 A | 6/1997 |
| JP | 09-295710 | 11/1997 |
| JP | 11-106080 | 4/1999 |
| JP | 11-325190 | 11/1999 |
| JP | 2000-283245 A | 10/2000 |
| JP | 2003-120756 A | 4/2003 |
| JP | 2003-254391 A | 9/2003 |
| JP | 2005-271329 A | 10/2005 |

OTHER PUBLICATIONS

Rubber Technology Handbook, Hanser Publishers, Munich Vienna, New York, 1989, pp. 96-259.
Japanese Office Action dated Oct. 20, 2009; Patent Application No. 2005-333290 with English translation.

* cited by examiner

*Primary Examiner* — Michael Mansen
*Assistant Examiner* — Henry Liu
(74) *Attorney, Agent, or Firm* — Studebaker & Brackett PC; Donald R. Studebaker

(57) ABSTRACT

A drive belt includes an endless belt body made of an ethylene-α-olefin elastomer composition and a cord embedded in the belt body to form a spiral at a specified pitch in a widthwise direction of the belt. The drive belt has a bending stiffness not larger than 0.064 N·cm² per a belt width of 4.8 mm and the belt body has a Wallace rubber hardness not smaller than 60°.

16 Claims, 3 Drawing Sheets

DRIVE BELT

CROSS-REFERENCE TO RELATED APPLICATION

This nonprovisional application claims priority under 35 USC §119(a) on Patent Application No. 2005-333290 filed in Japan on Nov. 17, 2005, the entire contents of which are hereby incorporated by reference.

BACKGROUND OF THE INVENTION (a) Field of The Invention

This invention relates to drive belts having a belt body made of ethylene-α-olefin elastomer composition.

(b) Description of The Related Art

Various sheet handling machines and equipment, including printers and automatic vending machines, use a light-duty toothed belt for conveying sheets, such as paper sheets, bank notes or cards. Such a light-duty toothed belt is required to have high flexibility and small bending resistance for the purpose of compaction of a drive source due to space saving and, naturally, also required to have excellent conveying capability.

Published Japanese Patent Application No. H07-77244 discloses a conveying toothed belt that includes a plurality of teeth disposed at specified intervals in the longitudinal direction of the belt and a backing rubber having a longitudinal cord embedded therein, wherein a longitudinally continuous, electrical conducting layer is disposed in a tooth side rubber of the belt and at least part of the electrical conducting layer is exposed at a contact surface with a pulley or a flange for the pulley. Further, the document describes that with the above configuration, the belt body can be prevented from static electrification, whereby the carrying surface of the belt can be protected against adhesion of pieces coming from paper sheets carried thereon, foreign particles and dusts and prevented from reduction in coefficient of friction.

Published Japanese Patent Application No. H09-144816 discloses a toothed belt including a plurality of teeth disposed along the lengthwise direction, a backing part having a cord embedded therein and a facing fabric covering the surfaces of the teeth, wherein a rubber layer constituted by the backing part or the backing part and the teeth is doped at least with 5 to 80 parts by weight of powdered inorganic porous material as a porous filler with respect to 100 parts by weight of the rubber, the porous filler is exposed at the surface of the backing part by grinding and the rubber layer constituted by the backing part and the teeth is made of a rubber composition containing chloroprene rubber with crystallization resistance. Further, the document describes that with the above configuration, the belt can be used without trouble even under severe environmental temperature conditions, can maintain a constant coefficient of friction and flexibility even if oil or water adheres to the belt back face, can be prevented from contaminating conveyed objects, such as cards, bank notes and tickets, and can be reduced in rate of rotational variation and thereby increased in feeding accuracy.

Published Japanese Patent Application No. H09-295710 discloses a conveying toothed belt including a belt body having a cord embedded therein, a plurality of teeth projecting from the inner face of the belt body at lengthwise spaced intervals and a tooth fabric covering the surfaces of the teeth, the belt body and the teeth constituting a rubber layer, wherein the rubber layer constituted by the belt body and the teeth is made of a rubber composition containing chloroprene rubber with crystallization resistance, the belt can be prevented from increase in hardness due to crystallization of the rubber layer and decrease in coefficient of friction at low temperatures because the chloroprene rubber with crystallization resistance is less likely to crystallize even if it is allowed to stand for a long time under low-temperature environments. Further, the document describes that with the above configuration, the belt can be used without trouble even under severe environmental temperature conditions.

Published Japanese Patent Application No. H11-325190 discloses a toothed belt for conveying sheets including a rubber belt body, a large number of rubber teeth disposed on the surface of the rubber belt body at a specified pitch in the lengthwise direction of the belt to extend in the widthwise direction of the belt and a cord of substantially circular section embedded in the rubber belt body to extend in the lengthwise direction of the belt while being turned at a specified pitch in the widthwise direction of the belt, wherein the cord pitch is set twice to three times larger than the cord diameter, the tooth pitch is set not larger than 3 mm and the cord diameter is set not larger than 0.5 mm. Further, the document describes that with the above configuration, the belt bending stiffness can be decreased without changing the rubber material for the rubber belt body.

Published Japanese Patent Application No. H11-106080 discloses a conveying flat belt comprising a conveying rubber layer and a rubber-made tension retaining layer, wherein a high-modulus compound rubber exhibiting at least 1.0 to 20.0 MPa at 10% modulus is used as the rubber-made tension retaining layer, the conveying rubber layer preferably has a layered structure of rubber compounds with a coefficient of friction of 0.7 to 2.0 and the rubber-made tension retaining layer contains or uses, as means for enhancing the modulus, at lease one of carbon, reinforcing short fibers and rubber obtained by compounding a metallic salt of unsaturated carboxylic acid with an organic peroxide and crosslinking them. Further, the document describes that with the above configuration, the belt can be used at a stable tension with the center distance fixed, the positioning accuracy can be increased, disengage of the belt from the pulleys and offset and crinkles of conveyed objects can be prevented and the conveying accuracy is excellent.

SUMMARY OF THE INVENTION

An object of the present invention is to provide a drive belt achieving energy saving.

A solution of the present invention attaining the above object is a drive belt including an endless belt body made of an ethylene-α-olefin elastomer composition and a cord embedded in the belt body to form a spiral at a specified pitch in a widthwise direction of the belt, wherein the drive belt has a bending stiffness not larger than 0.064 N·cm$^2$ per a belt width of 4.8 mm and the belt body has a Wallace rubber hardness not smaller than 60°.

Another solution of the present invention is a drive belt including an endless belt body and a cord embedded in the belt body to form a spiral at a specified pitch in a widthwise direction of the belt, wherein at least a portion of the belt body in which the cord is embedded is made of an ethylene-α-olefin elastomer composition obtained by a crosslinking action using organic peroxide as a crosslinker and sulfur as a crosslinking assistant.

According to the above solutions of the present invention, the belt body is flexible and, therefore, the driving torque of the drive source is small, thereby providing energy saving.

Other objects, features and advantages of the present invention will be apparent from the following description with reference to the accompanying drawings.

DETAILED DESCRIPTION OF THE PREFERRED EMBODIMENTS

Hereinafter, embodiments of the present invention will be described in detail with reference to the drawings.

Embodiment 1

Figure 1:
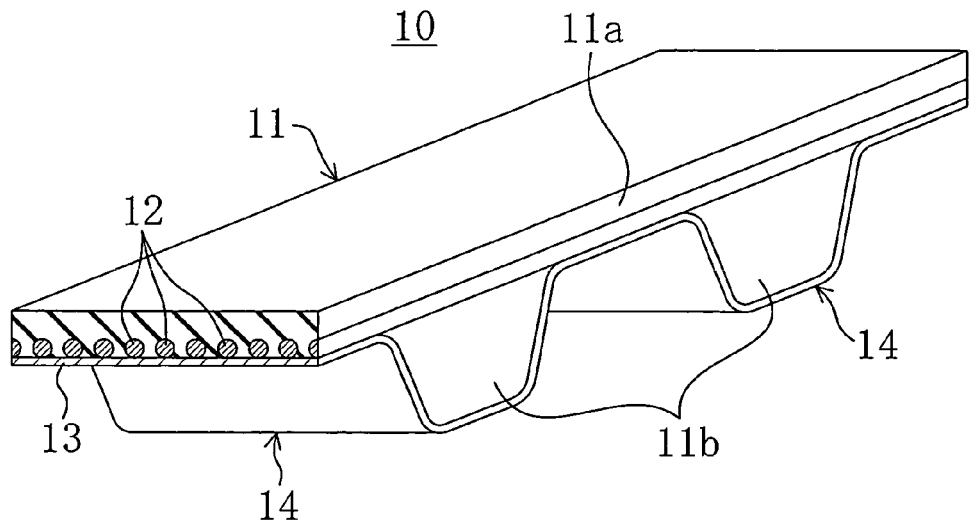
FIG. 1 is a perspective view of a toothed belt.

FIG. 1 shows a toothed belt 10 according to Embodiment 1.

In the toothed belt 10, an endless toothed belt body 11 is composed of a band-shaped backing rubber part 11a on the outer side of the belt and a plurality of tooth rubber parts 11b disposed on the inner side of the belt integrally with the backing rubber part 11a and at a specified pitch in the lengthwise direction of the belt. The toothed belt 10 also has a cord 12 embedded in the toothed belt body 11 to form a spiral at a specified pitch in the widthwise direction of the belt, thereby dividing the toothed belt body 11 into the backing rubber part 11a and the tooth rubber parts 11b. Furthermore, the toothed belt 10 is covered at the inner surface, i.e., at the surface on the tooth rubber part 11b side, with a reinforcing fabric 13. Thus, the tooth rubber parts 11b are covered with the reinforcing fabric 13, thereby forming a plurality of teeth 14. At the roots of the teeth 14, the reinforcing fabric 13 and the cord 12 may be in contact with each other or a rubber layer may be interposed between them. The toothed belt body 11 constitutes a portion in which a cord 12 is embedded.

The toothed belt 10 has, for example, a length of 60 to 1400 mm, a width of 3.2 to 19.0 mm, a thickness of 1.0 to 3.0 mm and a tooth pitch of 2.032 to 5.080 mm. Each tooth 14 has, for example, a height of 0.5 to 2.0 mm and a width of 0.7 to 1.4 mm at tooth tip. The profile of each tooth 14 is, for example, trapezoidal or semicircular but not limited to these shapes.

The toothed belt 10 preferably has a bending stiffness not larger than 0.064 N·cm$^2$, more preferably not larger than 0.060 N·cm$^2$, and still more preferably not larger than 0.056 N·cm$^2$, per a belt width of 4.8 mm. Since the bending stiffness of the belt per a belt width of 4.8 mm is as such, the driving torque of the drive source is small and, therefore, energy saving can be achieved. The bending stiffness of the toothed belt 10 is determined, like the later-described Working Examples, using the geometric moment of inertia $I=bh^3/12$ where the belt profile is rectangular, the belt width is indicated by the width b of a specimen and the belt thickness at each tooth space root is indicated by the thickness h of the specimen.

The toothed belt body 11 of the toothed belt 10 preferably has a Wallace rubber hardness not smaller than 60°, more preferably 62° to 75°, and still more preferably 65° to 75°. Since the Wallace rubber hardness is as such, the belt has excellent adhesive wear resistance. The method of measuring the Wallace rubber hardness is as described later in relation to Working Examples.

The toothed belt body 11 is made of an ethylene-α-olefin elastomer composition. Since, thus, the toothed belt body 11 contains no halogen but is made of an ethylene-α-olefin elastomer composition excellent in ozone resistance and low-temperature resistance, it is environmentally friendly and the toothed belt 10 itself is also excellent in ozone resistance and low-temperature resistance. An ethylene-α-olefin elastomer composition is a crosslinked rubber composition obtained by mixing and kneading ethylene-α-olefin elastomer used as a raw rubber with a crosslinker, a crosslinking assistant, a crosslinking accelerator, a crosslinking supplement accelerator, a reinforcing agent, an antioxidant and a plasticizer to produce uncrosslinked rubber composition and applying heat and pressure to the uncrosslinked rubber composition to crosslink molecules of the ethylene-α-olefin elastomer. In this case, the crosslinker is an essential constituent and the crosslinking assistant is an optional constituent. However, both of them are preferably used together.

Examples of ethylene-α-olefin elastomer used as a raw rubber include ethylene-propylene rubber (EPR), ethylene-butene rubber (EBR), ethylene-octene rubber (EOR) and ethylene-propylene-diene monomer (EPDM) rubber. Ethylene-α-olefin elastomer as a raw rubber can be composed of one of these rubbers or a mixture of two or more thereof. However, from the viewpoint of making the toothed belt body 11 flexible to bring the belt bending stiffness and the Wallace rubber hardness of the toothed belt 10 within the above ranges, the ethylene-α-olefin elastomer preferably contain a diene component and, further, the content of the diene component is preferably 4.0 to 10.0 mass % and more preferably 4.5 to 10.0 mass %. A particularly preferable ethylene-α-olefin elastomer as a raw rubber is ethylene-propylene-diene monomer rubber.

Examples of the crosslinker include organic peroxides, such as 2,4-dichlorobenzoyl peroxide, benzoyl peroxide, 1,1-di-t-butylperoxy-3,3,5-trimethyl cyclohexane, 2,5-dimethyl-2,5-dibenzoyl peroxyhexane, n-butyl-4,4-di-t-butylperoxy diisopropyl valerate, dicumyl peroxide, t-butylperoxy benzoate, di-t-butylperoxy diisopropyl benzene, t-butylcumyl peroxide, 2,5-dimethyl-2,5-di-t-butylperoxy hexane, di-t-butyl peroxide, 2,5-dimethyl-2,5-di-t-butylperoxy hexane-3,1, 1-di(t-butylperoxy) cyclohexane, and 1,1-di(t-hexylperoxy) cyclohexane. The crosslinker can be composed of a single substance or a mixture of two or more substances selected from these organic peroxides. However, from the viewpoint of making the toothed belt body 11 flexible to bring the belt bending stiffness and the Wallace rubber hardness of the toothed belt 10 within the above ranges, organic peroxides with a one-minute half-life temperature not larger than 170° C., such as 1,1-di(t-butylperoxy) cyclohexane, are preferably used. The amount of crosslinker added is preferably 0.01 to 0.05 mol, more preferably 0.01 to 0.04 mol and still more preferably 0.01 to 0.03 mol with respect to 100 parts by mass of raw rubber.

Examples of the crosslinking assistant include sulfur, tetrahydrofurfurylmethacrylate, ethylenedimethacrylate, 1,3-butylenedimethacrylate, 1,4-butylenedimethacrylate, 1,6-hexanedioldimethacrylate, polyethyleneglycoldimethacrylate, 1,4-butanedioldiacrylate, 1,6-hexanedioldiacrylate, 2,2'-bis(4-methacryloxydiethoxyphenyl)propane, 2,2'-bis(4-acryloxydiethoxyphenyl)propane, trimethylolpropanetriacrylate, trimethylolpropanetrimethacrylate, pentaerythritoltriacrylate, 3-chloro-2-hydroxypropylmethacrylate, oligoesteracrylate, aluminiummethacrylate, zincmethacrylate, magnesiumdimethacrylate, calciumdimethacrylate, triallylisocyanurate, triallylcyanurate, triallyltrimellitate, diallylphthalate, diallylchlorendate, divinylbenzene, 2-vinylpyridine, N,N'-methylenebisacrylamide, p-quinonedioxin, p,p'-dibenzoylquinonedioxin, 1,2-polybutadiene, and dipentamethylenethiuramtetrasulfide. The crosslinking assistant can be composed of a single substance or a mixture of two or more selected from these substances. However, from the viewpoint of making the toothed belt body 11 flexible to bring the belt bending stiffness and the Wallace rubber hardness of the toothed belt 10 within the above ranges, sulfur is preferably used. The amount of crosslinking assistant added is preferably 0.1 to 3.0 parts by mass, more preferably 0.5 to 2.0 parts by mass and still more preferably 0.5 to 1.0 parts by mass with respect to 100 parts by mass of raw rubber. If sulfur is used as a crosslinking assistant, the amount thereof added is preferably not smaller than 0.1 parts by mass with respect to 100 parts by mass of raw rubber. In addition, the ethylene-α-olefin elastomer composition making the toothed belt body 11 preferably has a total sulfur content not smaller than 0.1 mass %, more preferably not smaller than 0.3 mass % and still more preferably not smaller than 0.5 mass % inclusive of sulfur added as a crosslinking assistant.

Examples of the crosslinking supplement accelerator include metal oxides such as zinc oxide and magnesium oxide, metal carbonates such as zinc carbonate, fatty acids such as stearic acid and oleic acid and their derivatives, and amines such as di-n-butylamine and dicyclohexylamine. The crosslinking supplement accelerator can be composed of a single substance or a mixture of two or more selected from these substances.

Examples of the reinforcing agent include inorganic reinforcing agents such as carbon blacks, such as SAF, SAF-HS, ISAF, N-339, ISAF-LS, I-ISAF-HS, HAF, HAF-HS, N-351, HAF-LS, LI-HAF, MAF, FEF, FEF-HS, SRF, SRF-LM, GPF, ECFN-234, FT and MT, white carbon (wet or dry silica), basic magnesium carbonate, calcium carbonate, magnesium silicate and hard clay, and organic reinforcing agents such as high-styrene resin, coumarone-indene resin and phenol formaldehyde resin. The reinforcing agent can be composed of a single substance or a mixture of two or more selected from these substances. The amount of reinforcing agent added is preferably 5 to 90 parts by mass with respect to 100 parts by mass of raw rubber.

Examples of the antioxidant include amine-based antioxidants such as 224 (TMDQ), PA (PAN), DP (DPPD) and 3C (IPPD), phenol-based antioxidants such as SP, W, 300 (TB-MTBP) and NS-7 (DBHQ), imidazole-based antioxidants such as MB (MBI), nickel salt-based antioxidants such as NMC, thiourea-based antioxidants such as NS-10, thioether-based antioxidants such as DLTP (DLTDP), phosphorous-based antioxidants such as TNP, and wax-based antioxidants. The antioxidant can be composed of a single substance or a mixture of two or more selected from these substances. The amount of antioxidant added is preferably 0.1 to 10 parts by mass with respect to 100 parts by mass of raw rubber.

Examples of the plasticizer include phthalic acid derivatives, isophthalic acid derivatives, tetrahydrophthalic acid derivatives, adipic acid derivatives, azelaic acid derivatives, sebacic acid derivatives, dodecanoic-2 acid derivatives, maleic acid derivatives, fumaric acid derivatives, trimellitic acid derivatives, pyromellitic acid derivatives, citric acid derivatives, itaconic acid derivatives, oleic acid derivatives, recinoleic acid derivatives, stearic acid derivatives, sulfonic acid derivatives, phosphoric acid derivatives, glutaric acid derivatives, glycol derivatives, glycerin derivatives, paraffin derivatives, epoxy derivatives and polymerized plasticizers. The plasticizer can be composed of a single substance or a mixture of two or more selected from these substances. The amount of plasticizer added is preferably 5 to 50 parts by mass with respect to 100 parts by mass of raw rubber.

The ethylene-α-olefin elastomer composition may further contain other ingredients mixed and kneaded therein, such as process oil, inorganic filler and pigment.

The cord 12 is constituted by, for example, a cord obtained by dipping a bundle of glass fibers in an RFL liquid (a water solution of resorcinol formaldehyde latex), heat-treating and then twisting it, a cord obtained by dipping a twisted yarn of aramid fibers in an RFL liquid and then heat-treating it, or a cord obtained by dipping a wire rope in rubber cement and then heat-treating it. The cord 12 made of glass fibers or aramid fibers may be obtained by additionally undergoing dipping in rubber cement and then heat treatment. For example, the cord 12 has a diameter of 0.1 to 0.4 mm and a pitch of 0.1 to 0.7 mm in the belt widthwise direction.

The reinforcing fabric 13 is constituted by, for example, a fabric obtained by dipping a woven fabric (such as a twilled fabric) of nylon fibers or aramid fibers in rubber cement and then heat-treating it or the fabric further having a coating of paste rubber cement on the surface facing the toothed belt body 11. For example, the reinforcing fabric 13 has a thickness of 0.1 to 0.7 mm.

As described above, the toothed belt 10 configured as above has a bending stiffness not larger than 0.064 N·cm$^2$ per a belt width of 4.8 mm and its toothed belt body 11 has a Wallace rubber hardness not smaller than 60°. Furthermore, there has been no toothed belt that exhibits such properties and has a toothed belt body 11 made of an ethylene-α-olefin elastomer composition.

The toothed belt 10 configured as above can be fabricated by conventionally known fabrication methods.

The toothed belt 10 is used as a conveying belt of a sheet conveyor for conveying sheets, such as papers, bank notes or cards, in various machines and equipment including printers and automatic bending machines.

Figure 2:
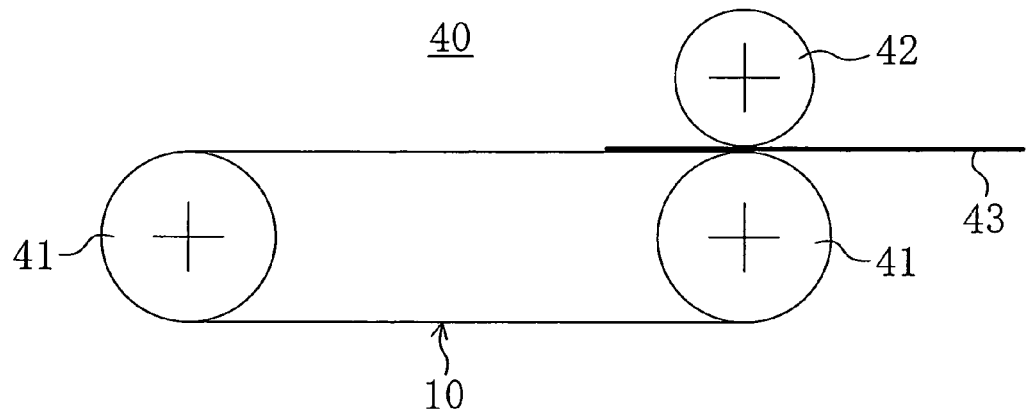
FIG. 2 is a diagram showing the structure of a sheet conveyor.

FIG. 2 shows an example of such a sheet conveyor 40.

The sheet conveyor 40 includes a toothed belt 10, a pair of drive and driven toothed pulleys 41 and a pressure retaining roller 42.

A plurality of toothed belts 10 are wrapped around the pair of toothed pulleys 41 at spaced intervals in the axial direction of the toothed pulleys 41. Each toothed pulley 41 has a diameter of 10 to 20 mm.

The pressure retaining roller 42 pinches the toothed belts 10 against the drive toothed pulley 41 and is rotatably disposed to apply a surface pressure of 0.04 to 0.08 MPa to the toothed belts 10. For example, the pressure retaining roller 42 has a diameter of 10 to 20 mm.

Furthermore, the sheet conveyor 40 is configured so that when the drive toothed pulley 41 rotates, the pressure retaining roller 42 follows it into rotation, pinches a sheet 43 against the pulley 41, pulls it in and conveys it on the back face of the toothed belt 10.

Embodiment 2

Figure 3:
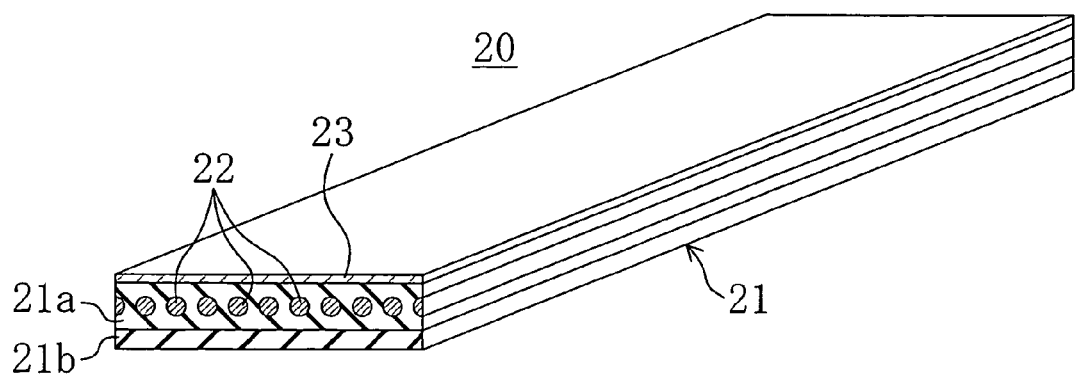
FIG. 3 is a perspective view of a flat belt.

FIG. 3 shows a flat belt 20 according to Embodiment 2 of the present invention.

In the flat belt 20, an endless flat belt body 21 is composed of a band-shaped adhesion rubber (a portion in which a cord 22 is embedded) 21a on the outer side of the belt and a band-shaped compression rubber 21b located on the inner side of the belt and laid integrally on the adhesion rubber 21a.

The flat belt 20 also has a cord 22 embedded in the adhesion rubber 21a in the middle of the thickness to form a spiral at a specified pitch in the widthwise direction of the belt. Furthermore, the flat belt 20 is covered at the outer surface with a reinforcing fabric 23.

The flat belt 20 preferably has a bending stiffness not larger than 0.064 N·cm², more preferably not larger than 0.060 N·cm², and still more preferably not larger than 0.056 N·cm², per a belt width of 4.8 mm. Since the bending stiffness of the belt per a belt width of 4.8 mm is as such, the driving torque of the drive source is small and, therefore, energy saving can be achieved. The bending stiffness of the flat belt 20 is determined, like the later-described Working Examples, using the geometric moment of inertia $I=bh^3/12$ where the belt profile is rectangular, the belt width is indicated by the width b of a specimen and the belt thickness is indicated by the thickness h of the specimen.

The flat belt body 21 of the flat belt 20 preferably has a Wallace rubber hardness not smaller than 60°, more preferably 62° to 75°, and still more preferably 65° to 75°.

The adhesion rubber 21a is made of an ethylene-α-olefin elastomer composition and its composition is the same as the toothed belt body 11 of the toothed belt 10 of Embodiment 1.

Examples of a rubber composition making the compression rubber 21b include ethylene-α-olefin elastomer compositions, natural rubber (NR) compositions, styrene-butadiene rubber (SBR) compositions, polybutadiene rubber (BR) compositions, acrylonitrile-butadiene rubber (NBR) compositions, hydrogenated acrylonitrile-butadiene rubber (H-NBR) compositions, chloroprene rubber (CR) compositions, chlorosulfonated polyethylene rubber (CSM) compositions, isobutylene-isoprene rubber (IIR) compositions, acrylic rubber (ACM) compositions, silicone rubber compositions, millable urethane rubber compositions, and fluorine rubber compositions. The rubber composition making the compression rubber 21b can be composed of a single rubber composition of these rubber compositions or a mixture of two or more thereof. However, from the viewpoint of ease of fabrication, an ethylene-α-olefin elastomer composition, particularly, an ethylene-α-olefin elastomer composition having the same composition as the adhesion rubber 21a is preferably used. The rubber composition making the compression rubber 21b may be mixed with short fibers.

The cord 22 is constituted by, for example, a cord obtained by dipping a twisted yarn of polyethylene terephthalate (PET) fibers, polyethylene naphthalate (PEN) fibers or aramid fibers in an RFL liquid and heat-treating it. The cord 22 may be obtained by additionally undergoing dipping in rubber cement and then heat treatment. For example, the cord 22 has a diameter of 0.4 to 0.8 mm and a pitch of 0.4 to 1.0 mm in the belt widthwise direction.

The reinforcing fabric 23 is constituted by, for example, a fabric obtained by dipping a woven fabric (such as a plain fabric) of cotton, nylon fibers or polyethylene terephthalate fibers in rubber cement and then heat-treating it. For example, the reinforcing fabric 23 has a thickness of 0.5 to 1.0 mm.

The flat belt 20 configured as above can be fabricated by conventionally known fabrication methods.

Although in Embodiment 2 the flat belt 20 has a structure in which a reinforcing fabric 23 is disposed on the belt outer face, the flat belt structure is not particularly limited to this. For example, a band-shaped tension rubber may be disposed instead of the reinforcing fabric 23 at the same position. The tension rubber can be made of the same rubber composition as the compression rubber 21b.

Other Embodiments

Although in the above embodiments the toothed belt 10 or the flat belt 20 is used, the drive belt of the present invention is not limited to these types of belts but may be a common V-belt, a common V-ribbed belt or a common cogged V-belt.

-Test Evaluations-

Belts for Evaluation Test

Belts for evaluation test of Working Examples 1 to 13 and Comparative Examples 1 to 6 were fabricated as described below. Their detailed compositions are also shown in Tables 1 to 4.

WORKING EXAMPLE 1

A toothed belt of Working Example 1 was fabricated which has a toothed belt body made of an EPDM rubber composition obtained by mixing and kneading 100 parts by mass of raw rubber, i.e., EPDM containing 4.5 mass % of diene component (manufactured by JSR Corporation and marketed under the trade name of EP22), with 3.2 parts by mass of crosslinker, i.e., dicumyl peroxide having a one-minute half-life temperature of 175.2° C. (manufactured by NOF Corporation, marketed under the trade name of Percumyl D and hereinafter referred to as Organic Peroxide 1), 5 parts by mass of zinc oxide JIS 3 (manufactured by Hakusui Chemical Industries, Ltd. and hereinafter also referred to as Crosslinking Supplement Accelerator 1), 1 part by mass of stearic acid (hereinafter also referred to as Crosslinking Supplement Accelerator 2), 0.5 parts by mass of first antioxidant (manufactured by Ouchi Shinko Chemical Industrial Co., Ltd., marketed under the trade name of Nocrac 224 and hereinafter referred to as Antioxidant 1), 2 parts by mass of second antioxidant (manufactured by Ouchi Shinko Chemical Industrial Co., Ltd, marketed under the trade name of Nocrac MB and hereinafter referred to as Antioxidant 2), 65 parts by mass of reinforcing agent, i.e., FEF (manufactured by Nippon Steel Chemical Carbon Co., Ltd. and marketed under the trade name of HTC#100) and 40 parts by mass of process oil (manufactured by Nippon Sun Oil Co., Ltd. and marketed under the trade name of Sunpar 2280). The obtained toothed belt of Working Example 1 had a length of 150 mm, a width of 4.8 mm, a thickness of 1.1 mm and a tooth pitch of 2.032 mm. Each tooth had a height of 0.51 mm and a width of 0.76 mm at the tooth tip.

The cord used is a cord obtained by dipping a fiber bundle of two sets of 200 glass fibers of 9 μm diameter in an RFL liquid containing a styrene-butadiene-vinylpyridine terpolymer latex (a water solution of resorcinol formaldehyde latex), heat-treating and then twisting it. The reinforcing fabric used is a fabric obtained by dipping a twilled fabric of nylon 6,6 fibers in an RFL liquid containing a styrene-butadiene-vinylpyridine terpolymer latex (a water solution of resorcinol formaldehyde latex) and then heat-treating it.

WORKING EXAMPLE 2

A toothed belt of Working Example 2 was fabricated which has the same configuration and composition as Working Example 1, except that the amount of process oil was 35 parts by mass and 6.8 parts by mass of 1,1-di(t-butylperoxy)cyclohexane having a one-minute half-life temperature of 153.8° C. (manufactured by NOF Corporation, marketed under the trade name of Perhexa C-40 and hereinafter referred to as Organic Peroxide 2) was used as a crosslinker.

WORKING EXAMPLE 3

A toothed belt of Working Example 3 was fabricated which has the same configuration and composition as Working Example 2, except that the amount of FEF was 45 parts by mass and the amount of process oil was 15 parts by mass.

WORKING EXAMPLE 4

A toothed belt of Working Example 4 was fabricated which has the same configuration and composition as Working Example 2, except that the amount of FEF was 40 parts by mass, the amount of process oil was 5 parts by mass and 0.5 parts by mass of sulfur (oil sulfur) was additionally mixed as a crosslinking assistant.

WORKING EXAMPLE 5

A toothed belt of Working Example 5 was fabricated which has the same configuration and composition as Working Example 4, except that the amount of FEF was 20 parts by mass, the amount of process oil was 15 parts by mass and 30 parts by mass of wet silica (manufactured by Tokuyama Corporation and marketed under the trade name of Tokusil GU) was additionally mixed as a reinforcing agent.

WORKING EXAMPLE 6

A toothed belt of Working Example 6 was fabricated which has the same configuration and composition as Working Example 4, except that the amount of FEF was 45 parts by mass and the amount of sulfur was 0.1 parts by mass.

WORKING EXAMPLE 7

A toothed belt of Working Example 7 was fabricated which has the same configuration and composition as Working Example 6, except that the amount of sulfur was 0.5 parts by mass.

WORKING EXAMPLE 8

A toothed belt of Working Example 8 was fabricated which has the same configuration and composition as Working Example 6, except that the amount of sulfur was 1.0 parts by mass.

WORKING EXAMPLE 9

A toothed belt of Working Example 9 was fabricated which has the same configuration and composition as Working Example 6, except that 3.2 parts by mass of 1,1-di(t-hexylperoxy) cyclohexane having a one-minute half-life temperature of 149.2° C. (manufactured by NOF Corporation, marketed under the trade name of Perhexa HC and hereinafter referred to as Organic Peroxide 3) was used as a crosslinker.

WORKING EXAMPLE 10

A toothed belt of Working Example 10 was fabricated which has the same configuration and composition as Working Example 6, except that 4.0 parts by mass of 2,5-dimethyl-2,5-dibenzoyl peroxyhexane having a one-minute half-life temperature of 158.2° C. (manufactured by NOF Corporation, marketed under the trade name of Perhexa 25Z and hereinafter referred to as Organic Peroxide 4) was used as a crosslinker.

WORKING EXAMPLE 11

A toothed belt of Working Example 11 was fabricated which has the same configuration and composition as Working Example 6, except that EPDM containing 8.0 mass % of diene component (manufactured by JSR Corporation and marketed under the trade name of EP33) was used as a raw rubber.

WORKING EXAMPLE 12

A toothed belt of Working Example 12 was fabricated which has the same configuration and composition as Working Example 6, except that EPDM containing 1.5 mass % of diene component (manufactured by JSR Corporation and marketed under the trade name of EP43) was used as a raw rubber.

WORKING EXAMPLE 13

A toothed belt of Working Example 13 was fabricated which has the same configuration and composition as Working Example 6, except that EPDM containing 2.5 mass % of diene component (manufactured by JSR Corporation and marketed under the trade name of EP93) was used as a raw rubber.

COMPARATIVE EXAMPLE 1

A toothed belt of Comparative Example 1 was fabricated which has the same configuration and composition as Working Example 1, except that the amount of FEF was 45 parts by mass and the amount of process oil was 35 parts by mass.

COMPARATIVE EXAMPLE 2

A toothed belt of Comparative Example 2 was fabricated which has the same configuration and composition as Working Example 3, except that the amount of process oil was 5 parts by mass.

COMPARATIVE EXAMPLE 3

A toothed belt of Comparative Example 3 was fabricated which has the same configuration and composition as Working Example 1, except that the amount of FEF was 25 parts by mass, the amount of process oil was 15 parts by mass and 40 parts by mass of heavy calcium carbonate was additionally mixed as a reinforcing agent.

COMPARATIVE EXAMPLE 4

A toothed belt of Comparative Example 4 was fabricated which has the same configuration and composition as Working Example 2, except that the amount of FEF was 50 parts by mass and the amount of process oil was 50 parts by mass.

COMPARATIVE EXAMPLE 5

A toothed belt of Comparative Example 5 was fabricated which has the same configuration and composition as Working Example 6, except that no sulfur was used.

COMPARATIVE EXAMPLE 6

A toothed belt of Comparative Example 6 was fabricated which has the same configuration and composition as Working Example 1, except that the toothed belt body was made of a chloroprene rubber composition obtained by mixing and kneading 100 parts by mass of chloroprene rubber as a raw rubber with 0.75 parts by mass of M (MBT) as a crosslinking accelerator, 5 parts by mass of zinc oxide JIS 3 (manufactured by Hakusui Chemical Industries, Ltd.) as Crosslinking Supplement Accelerator 1, 1 part by mass of stearic acid as Crosslinking Supplement Accelerator 2, 4 parts by mass of magnesium oxide (manufactured by Kyowa Chemical Industry Co., Ltd., marketed under the trade name of Kyowamag 150 and hereinafter also referred to as Crosslinking Supplement Accelerator 3), 50 parts by mass of FEF as a reinforcing agent, and 15 parts by mass of di-(2-ethylhexyl) sebacate (DOS) as a plasticizer.

TABLE 1

|  |  | Working Example | | | | | | |
|---|---|---|---|---|---|---|---|---|
|  |  | 1 | 2 | 3 | 4 | 5 | 6 | 7 |
| Raw rubber | EPDM (diene: 1.5 mass %) | | | | | | | |
|  | EPDM (diene: 2.5 mass %) | | | | | | | |
|  | EPDM (diene: 4.5 mass %) | 100 | 100 | 100 | 100 | 100 | 100 | 100 |
|  | EPDM (diene: 8.0 mass %) | | | | | | | |
| Crosslinker | Organic Peroxide 1 (1-min. half-life temperature: 175.2° C.) | 3.2 | | | | | | |
|  | Organic Peroxide 2 (1-min. half-life temperature: 153.8° C.) | | 6.8 | 6.8 | 6.8 | 6.8 | 6.8 | 6.8 |
|  | Organic Peroxide 3 (1-min. half-life temperature: 149.2° C.) | | | | | | | |
|  | Organic Peroxide 4 (1-min. half-life temperature: 158.2° C.) | | | | | | | |
| Crosslinking assistant: sulfur (oil sulfur) | | | | | 0.5 | 0.5 | 0.1 | 0.5 |
| Crosslinking Supplement Accelerator 1: zinc oxide | | 5 | 5 | 5 | 5 | 5 | 5 | 5 |
| Crosslinking Supplement Accelerator 2: stearic acid | | 1 | 1 | 1 | 1 | 1 | 1 | 1 |
| Antioxidant 1: 224 | | 0.5 | 0.5 | 0.5 | 0.5 | 0.5 | 0.5 | 0.5 |
| Antioxidant 2: MB | | 2 | 2 | 2 | 2 | 2 | 2 | 2 |
| Reinforcing agent | FEF | 65 | 65 | 45 | 40 | 20 | 45 | 45 |
|  | Wet silica | | | | | | | |
|  | Heavy calcium carbonate | | | | | 30 | | |
| Process oil | | 40 | 35 | 15 | 5 | 15 | 5 | 5 |
| Total | | 216.7 | 215.3 | 175.3 | 160.8 | 180.8 | 165.4 | 165.8 |

TABLE 2

|  |  | Working Example | | | | | |
|---|---|---|---|---|---|---|---|
|  |  | 8 | 9 | 10 | 11 | 12 | 13 |
| Raw rubber | EPDM (diene: 1.5 mass %) | | | | | 100 | |
|  | EPDM (diene: 2.5 mass %) | | | | | | 100 |
|  | EPDM (diene: 4.5 mass %) | 100 | 100 | 100 | | | |
|  | EPDM (diene: 8.0 mass %) | | | | 100 | | |
| Crosslinker | Organic Peroxide 1 (1-min. half-life temperature: 175.2° C.) | | | | | | |
|  | Organic Peroxide 2 (1-min. half-life temperature: 153.8° C.) | 6.8 | | | 6.8 | 6.8 | 6.8 |
|  | Organic Peroxide 3 (1-min. half-life temperature: 149.2° C.) | | 3.2 | | | | |
|  | Organic Peroxide 4 (1-min. half-life temperature: 158.2° C.) | | | 4.0 | | | |
| Crosslinking assistant: sulfur (oil sulfur) | | 1.0 | 0.5 | 0.5 | 0.5 | 0.5 | 0.5 |
| Crosslinking Supplement Accelerator 1: zinc oxide | | 5 | 5 | 5 | 5 | 5 | 5 |
| Crosslinking Supplement Accelerator 2: stearic acid | | 1 | 1 | 1 | 1 | 1 | 1 |
| Antioxidant 1: 224 | | 0.5 | 0.5 | 0.5 | 0.5 | 0.5 | 0.5 |
| Antioxidant 2: MB | | 2 | 2 | 2 | 2 | 2 | 2 |
| Reinforcing agent | FEF | 45 | 45 | 45 | 45 | 45 | 45 |
|  | Wet silica | | | | | | |
|  | Heavy calcium carbonate | | | | | | |
| Process oil | | 5 | 5 | 5 | 5 | 5 | 5 |
| Total | | 166.3 | 166.2 | 163.0 | 165.8 | 165.8 | 165.8 |

TABLE 3

|  | | Comparative Example | | | | |
|---|---|---|---|---|---|---|
|  | | 1 | 2 | 3 | 4 | 5 |
| Raw rubber | EPDM (diene: 1.5 mass %) | | | | | |
|  | EPDM (diene: 2.5 mass %) | | | | | |
|  | EPDM (diene: 4.5 mass %) | 100 | 100 | 100 | 100 | 100 |
|  | EPDM (diene: 8.0 mass %) | | | | | |
| Cross-linker | Organic Peroxide 1 (1-min. half-life temperature: 175.2° C.) | 3.2 | | 3.2 | | |
|  | Organic Peroxide 2 (1-min. half-life temperature: 153.8° C.) | | 6.8 | | 6.8 | 6.8 |
|  | Organic Peroxide 3 (1-min. half-life temperature: 149.2° C.) | | | | | |
|  | Organic Peroxide 4 (1-min. half-life temperature: 158.2° C.) | | | | | |
| Crosslinking assistant: sulfur (oil sulfur) | | | | | | |
| Crosslinking Supplement Accelerator 1: zinc oxide | | 5 | 5 | 5 | 5 | 5 |
| Crosslinking Supplement Accelerator 2: stearic acid | | 1 | 1 | 1 | 1 | 1 |
| Antioxidant 1: 224 | | 0.5 | 0.5 | 0.5 | 0.5 | 0.5 |
| Antioxidant 2: MB | | 2 | 2 | 2 | 2 | 2 |
| Reinforcing agent | FEF | 45 | 45 | 25 | 50 | 5 |
|  | Wet silica | | | | | |
|  | Heavy calcium carbonate | | | 40 | | |
| Process oil | | 35 | 5 | 15 | 50 | 5 |
| Total | | 191.7 | 165.3 | 191.7 | 215.3 | 165.3 |

TABLE 4

|  | Comparative Example 6 |
|---|---|
| Raw rubber: Chloroprene rubber | 100 |
| Crosslinking accelerator: M | 0.75 |
| Crosslinking Supplement Accelerator 1: zinc oxide | 5 |
| Crosslinking Supplement Accelerator 2: stearic acid | 1 |
| Crosslinking Supplement Accelerator 3: magnesium oxide | 4 |
| Reinforcing agent: FEF | 50 |
| Plasticizer: DOS | 15 |
| Total | 175.75 |

Evaluation Test Method

<Tensile Property of Rubber Composition>

Rubber compositions making the belt bodies of the toothed belts of Working Examples 1 to 13 and Comparative Examples 1 to 6 were subjected to a tension test using their respective dumbbell-shaped type 3 specimens according to JIS K6251, thereby obtaining their respective tensile stresses at 100% strain, tensile strengths and elongations at break.

<Sulfur Content>

Rubber compositions making the belt bodies of the toothed belts of Working Examples 1 to 13 and Comparative Examples 1 to 5 were measured in terms of total sulfur content by oxygen combustion flask method according to JIS K6233-1.

<Belt Bending Stiffness>

The toothed belts of Working Examples 1 to 13 and Comparative Examples 1 to 6 were measured in terms of bending modulus E by a bending test using an Olsen type stiffness tester according to JIS K7106 and their respective belt bending stiffnesses were calculated by multiplying the obtained bending moduli by their respective geometric moments of inertia I. Each specimen had a length of 7 cm, a width b of 4.8 mm corresponding to the belt width and a thickness h of 1.1 mm corresponding to the belt thickness at the bottom land, the span length S of the tester was 1.27 cm, the moment M of inertia of the pendulum when the load scale indicated 100% was 0.002648 N·m, and the bending angle $\phi$ was $50\pi/180$ rad. The test was conducted under conditions of an ambient temperature of 23±2° C. and a humidity of 50±5%. The geometric moment of inertia I used in calculating belt bending stiffness was $I=bh^3/12$ where the belt profile is rectangular.

<Wallace Rubber Hardness>

The outer faces of the toothed belt bodies of the toothed belts of Working Examples 1 to 13 and Comparative Examples 1 to 6 were measured in terms of Wallace rubber hardness using a Wallace rubber hardness tester.

<Belt Friction Tester>

Figure 4:
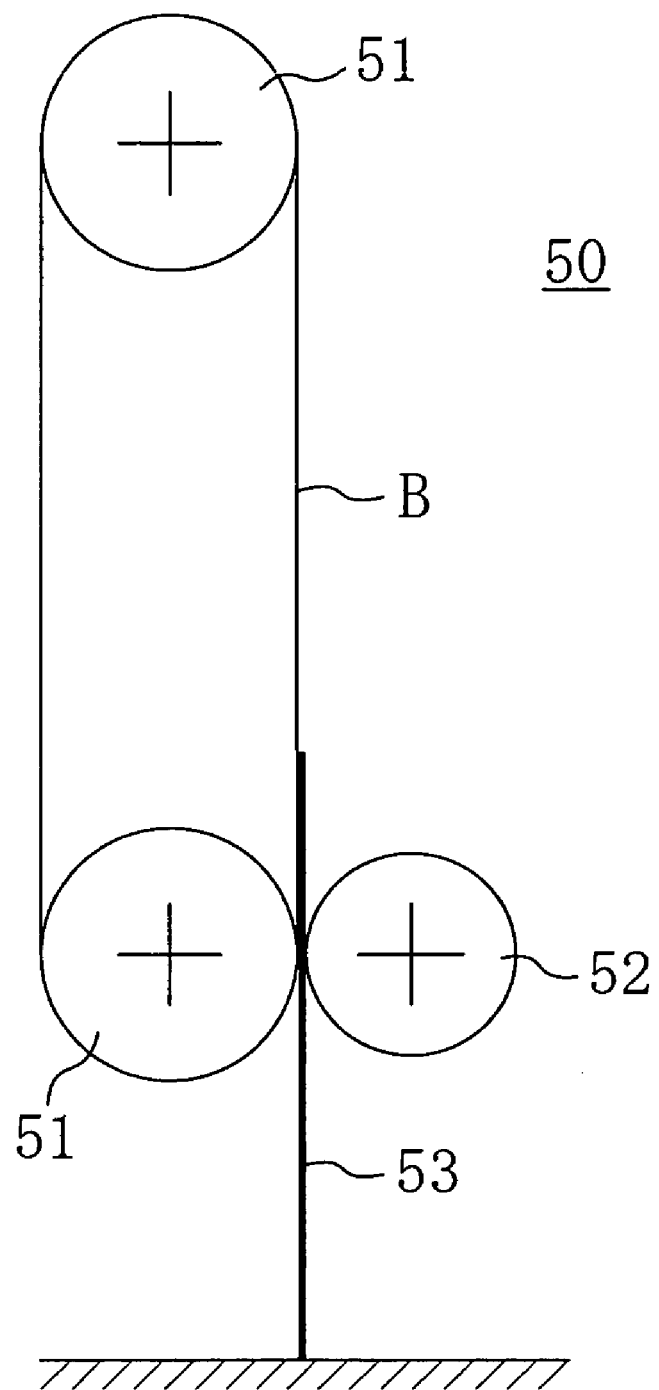
FIG. 4 is a diagram showing the structure of a belt friction tester.

FIG. 4 shows a belt friction tester 50.

The belt friction tester 50 includes a pair of drive and driven toothed pulleys 51 each having 20 teeth and a diameter of 12.94 mm and a pressure retaining roller 52 having a diameter of 10 mm. Each toothed belt B for evaluation test can be wrapped around the pair of toothed pulleys 51. The pressure retaining roller 52 pinches the toothed belt B against the drive toothed pulley 51 and is rotatably disposed to apply a pressing force of 1.96 N to the toothed belt B.

The belt friction tester 50 is configured so that an end of a PPC sheet 53 with the other end fixed is pinched between the drive toothed belt B and the pressure retaining roller 52, the drive toothed pulley 51 is rotated at 500 rpm for five hours in the direction in which the toothed belt B pulls the PPC sheet 53, thereby bringing the belt outer face into contact with the PPC sheet 53 and sliding the PPC sheet 53 on the belt outer face.

The toothed belts of Working Examples 1 to 13 and Comparative Examples 1 to 6 were subjected to the above friction test, their respective rates of wear were calculated from the mass difference of the belt between before and after the test, and the presence or absence of adherence after the test was visually checked.

Evaluation Test Results

<Rubber Composition Properties>

Table 5 shows respective tensile stresses at 100% strain, tensile strengths and elongations at break of the rubber compositions making the toothed belt bodies of the toothed belts of Working Examples 1 to 13 and Comparative Examples 1 to 6.

TABLE 5

|  | Working Example | | | | | | |
|---|---|---|---|---|---|---|---|
|  | 1 | 2 | 3 | 4 | 5 | 6 | 7 |
| Tensile stress at 100% strain (MPa) | 1.7 | 1.8 | 1.8 | 2.1 | 1.5 | 2.1 | 2.0 |
| Tensile strength (MPa) | 9.5 | 10.7 | 15.9 | 20.8 | 16.8 | 23.5 | 24.4 |
| Elongation at break (%) | 580 | 550 | 580 | 650 | 840 | 600 | 660 |

|  | Working Example | | | | | |
|---|---|---|---|---|---|---|
|  | 8 | 9 | 10 | 11 | 12 | 13 |
| Tensile stress at 100% strain (MPa) | 1.9 | 1.9 | 1.9 | 2.1 | 1.9 | 1.9 |
| Tensile strength (MPa) | 23.8 | 18.8 | 18.1 | 20.8 | 23.3 | 24.0 |

TABLE 5-continued

| Elongation at break (%) | 710 | 550 | 520 | 650 | 630 | 620 |

| | Comparative Example | | | | | |
|---|---|---|---|---|---|---|
| | 1 | 2 | 3 | 4 | 5 | 6 |
| Tensile stress at 100% strain (MPa) | 1.0 | 2.2 | 1.0 | 1.3 | 2.2 | 2.4 |
| Tensile strength (MPa) | 8.4 | 19.7 | 4.3 | 9.1 | 19.7 | 11.7 |
| Elongation at break (%) | 780 | 480 | 570 | 690 | 480 | 490 |

Reference to Table 5 shows that the rubber compositions of Working Examples 1 to 13 and Comparative Examples 1 to 6 have roughly similar properties.

<Belt Properties>

Figure 5:
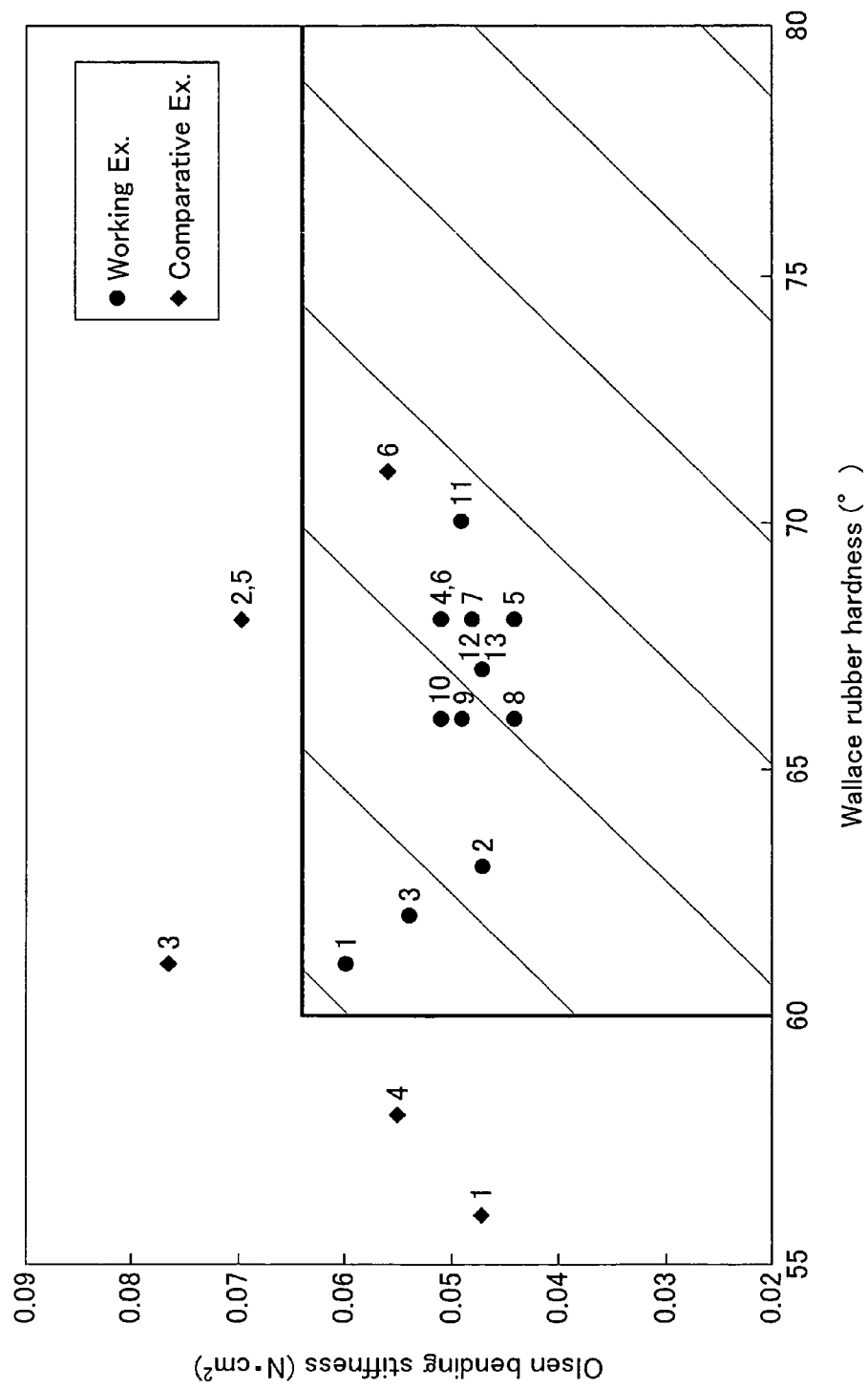
FIG. 5 is a map showing the test results of Working Examples 1 to 13 and Comparative Examples 1 to 6 on belt bending stiffness and Wallace rubber hardness.

Table 6 shows respective total sulfur contents of the toothed belt bodies of the toothed belts of Working Examples 1 to 13 and Comparative Examples 1 to 5 and respective bending stiffness per a belt width of 4.8 mm, Wallace rubber hardnesses, rates of wear and presence/absence of adherence of the toothed belts of Working Examples 1 to 13 and Comparative Examples 1 to 6. FIG. 5 shows the test results on respective bending stiffnesses per a belt width of 4.8 mm and Wallace rubber hardnesses of the toothed belts of Working Examples 1 to 13 and Comparative Examples 1 to 6.

TABLE 6

| | Working Example | | | | | | |
|---|---|---|---|---|---|---|---|
| | 1 | 2 | 3 | 4 | 5 | 6 | 7 |
| Total sulfur content (mass %) | 0.2 | 0.2 | 0.2 | 0.7 | 0.7 | 0.5 | 0.7 |
| Olsen bending stiffness (N · cm$^2$) | 0.060 | 0.047 | 0.054 | 0.052 | 0.044 | 0.051 | 0.048 |
| Wallace rubber hardness (°) | 61 | 63 | 62 | 68 | 68 | 68 | 68 |
| Rate of wear (%) | 4.0 | 4.4 | 3.2 | 3.4 | 5.6 | 2.5 | 3.2 |
| Presence/absence of adherence | abs. | abs. | abs. | abs. | abs. | abs. | abs. |

| | Working Example | | | | | |
|---|---|---|---|---|---|---|
| | 8 | 9 | 10 | 11 | 12 | 13 |
| Total sulfur content (mass %) | 1.0 | 0.7 | 0.7 | 0.7 | 0.7 | 0.7 |
| Olsen bending stiffness (N · cm$^2$) | 0.044 | 0.049 | 0.051 | 0.049 | 0.047 | 0.047 |
| Wallace rubber hardness (°) | 66 | 66 | 66 | 70 | 67 | 67 |
| Rate of wear (%) | 4.5 | 4.1 | 4.0 | 2.4 | 4.8 | 5.0 |
| Presence/absence of adherence | abs. | abs. | abs. | abs. | abs. | abs. |

| | Comparative Example | | | | | |
|---|---|---|---|---|---|---|
| | 1 | 2 | 3 | 4 | 5 | 6 |
| Total sulfur content (mass %) | 0.2 | 0.2 | 0.2 | 0.2 | 0.2 | — |
| Olsen bending stiffness (N · cm$^2$) | 0.047 | 0.070 | 0.076 | 0.055 | 0.070 | 0.056 |
| Wallace rubber hardness (°) | 56 | 68 | 61 | 58 | 68 | 71 |
| Rate of wear (%) | 11.9 | 1.6 | 8.7 | 9.6 | 1.6 | 2.1 |
| Presence/absence of adherence | pres. | abs. | abs. | pres. | abs. | abs. |

Reference to Table 6 shows that although Comparative Examples 1 and 4 have low belt bending stiffnesses smaller than 0.064 N·cm$^2$ per a belt width of 4.8 mm and therefore have excellent flexibility, they have low Wallace rubber hardnesses smaller than 60° and therefore have poor frictional resistance.

Although Comparative Examples 2, 3 and 5 have high Wallace rubber hardnesses larger than 60° and therefore excellent frictional resistance, they have belt bending stiffnesses higher than 0.064 N·cm$^2$ per a belt width of 4.8 mm and therefore have poor flexibility. Hence, these belts require large torque to actuate the drive source.

In contrast, Working Examples 1 to 13 have low belt bending stiffnesses smaller than 0.064 N·cm$^2$ per a belt width of 4.8 mm and therefore have excellent flexibility. In addition, they have high Wallace rubber hardnesses larger than 60° and therefore also have excellent frictional resistance, providing performance equivalent to Comparative Example 6 made of chloroprene rubber. Therefore, the toothed belts of Working Examples 1 to 13 require small torque to actuate the drive source, thereby providing energy saving.

Comparison between Working Examples 1 and 2 shows that the former used a larger amount of process oil but the latter has a smaller belt bending stiffness. The reason for this is probably that because the latter was higher in crosslinking speed than the former, it was weaker in the force to grip the cord by permeation of rubber. Therefore, the crosslinker used is preferably one having a one-minute half-life temperature not higher than 170° C. whereby the crosslinking speed can be high.

Comparison of Working Examples 6 to 8 with Comparative Example 5 shows that the former using not only organic peroxide as a crosslinker but also sulfur as a crosslinking assistant has a lower belt bending stiffness than the latter. Therefore, it is preferable to use organic peroxide as a crosslinker and sulfur as a crosslinking assistant together. Furthermore, comparison among Working Examples 6 to 8 shows that the larger the amount of sulfur added and the sulfur content are, the lower the belt bending stiffness is. Although sulfur was also detected from the examples using no sulfur as a crosslinking assistant, this is probably because sulfur was contained in any of the other additives, such as FEF.

Comparison among Working Examples 7 and 11 to 13 shows that the larger the content of diene component in EPDM is, the more excellent the frictional resistance is. It can be understood from these results that the content of diene component in EPDM is preferably not smaller than 4 mass %.

The present invention is not limited to the above embodiments but can be implemented in various forms without departing from its spirit and essential characteristics. The above embodiments should therefore be considered in all respects as illustrative only but not restrictive. The scope of the invention is indicated by the claims but not at all restricted to the description. Further, all modifications and changes which come within the range of equivalents of the claims are intended to be embraced within the scope of the invention.

What is claimed is:

1. A drive belt including an endless belt body made of an ethylene-α-olefin elastomer composition, ethylene-α-olefin elastomer of the ethylene-α-olefin elastomer composition containing a diene component at a content of 4 to 10 mass % and being used as a raw rubber, and a cord embedded in the belt body to form a spiral at a specified pitch in a widthwise direction of the belt, wherein the drive belt has a bending stiffness not larger than 0.064 N·cm$^2$ per a belt width of 4.8 mm and the belt body has a Wallace rubber hardness of 60° to 75°, both inclusive.

2. The drive belt of claim 1, wherein the ethylene-α-olefin elastomer composition making the belt body is obtained by a crosslinking action using organic peroxide as a crosslinker and sulfur as a crosslinking assistant.

3. A drive belt including an endless belt body and a cord embedded in the belt body to form a spiral at a specified pitch in a widthwise direction of the belt, wherein at least a portion of the belt body in which the cord is embedded is made of an ethylene-α-olefin elastomer composition obtained by a crosslinking action using organic peroxide as a crosslinker and sulfur as a crosslinking assistant, the ethylene-α-olefin elastomer of the ethylene-α-olefin elastomer composition containing a diene component at a content of 4 to 10 mass % and being used as a raw rubber.

4. The drive belt of claim 3, wherein the drive belt has a bending stiffness not larger than 0.064 N·cm$^2$ per a belt width of 4.8 mm and the belt body has a Wallace rubber hardness of 60° to 75°, both inclusive.

5. The drive belt of claim 2 or 3, wherein the ethylene-α-olefin elastomer composition has a total sulfur content of 0.1 to 1 mass %.

6. The drive belt of claim 2 or 3, wherein the ethylene-α-olefin elastomer composition is obtained by the crosslinking action using 0.1 to 1 parts by mass of sulfur with respect to 100 parts by mass of ethylene-α-olefin elastomer.

7. The drive belt of claim 2 or 3, wherein the one-minute half-life temperature of the organic peroxide is not higher than 170° C.

8. The drive belt of claim 1 or 3, wherein the belt body is the belt body of a toothed belt.

9. The drive belt of claim 1 or 3, wherein the belt body is the belt body of a flat belt.

10. The drive belt of claim 1 or 3 for use in conveying sheets.

11. The drive belt of claim 5, wherein the ethylene-α-olefin elastomer composition has a total sulfur content of 0.5 to 1 mass %.

12. The drive belt of claim 11, wherein the ethylene-α-olefin elastomer composition has a total sulfur content of 10.0 mass % or less.

13. The drive belt of claim 6, wherein the ethylene-α-olefin elastomer composition is obtained by the crosslink action using 0.5 parts by mass or more of sulfur with respect to 100 parts by mass of ethylene-α-olefin elastomer.

14. The drive belt of claim 13, wherein the ethylene-α-olefin elastomer composition is obtained by the crosslink action using 1.0 parts by mass or less of sulfur with respect to 100 parts by mass of ethylene-α-olefin elastomer.

15. The drive belt of claim 7, wherein the ethylene-α-olefin elastomer composition is obtained by the crosslink action using 3.2 parts by mass or more of the organic peroxide with respect to 100 parts by mass of ethylene-α-olefin elastomer.

16. The drive belt of claim 15, wherein the ethylene-α-olefin elastomer composition is obtained by the crosslink action using 6.8 parts by mass or less of the organic peroxide with respect to 100 parts by mass of ethylene-α-olefin elastomer.

* * * * *